United States Patent Office 3,755,590
Patented Aug. 28, 1973

3,755,590
CERTAIN TRIAZINES USED TO CONTROL BACTERIA AND FUNGI
Lester A. Brooks, East Norwalk, and Allan M. Harvey, Wilton, Conn., assignors to R. T. Vanderbilt Co., Inc., New York, N.Y.
No Drawing. Continuation of application Ser. No. 591,116, Nov. 1, 1966, which is a continuation-in-part of Ser. No. 439,432, Mar. 12, 1965, both abandoned. This application Nov. 19, 1970, Ser. No. 91,217
Int. Cl. A01n 9/22
U.S. Cl. 424—249  3 Claims

ABSTRACT OF THE DISCLOSURE

This invention relates to the use of certain hexahydro-1,3,5-trialkyl-s-triazines as bacteriostats and fungicides, and more particularly relates to their use in sanitizing dry cleaning solvents and mop saturants, as fungicides, and as preservatives against the growth of micro-organisms in cosmetics, rubber latices, adhesives, and drilling mud used in the petroleum industry.

This application is a continuation of our copending U.S. patent application Ser. No. 591,116 filed Nov. 1, 1966, now abandoned, which in turn was a continuation-in-part of our copending U.S. patent application Ser. No. 439,430, filed Mar. 12, 1965, now abandoned.

The increasing use in recent decades of various antibiotics has been countered in nature by the emergence of antibiotic-resistant strains of bacteria, especially staphylococci. Consequently there is an increased need to maintain higher s tandards of human sanitation in hospitals, homes, and personal hygiene. The nearly all-pervasive extent of bacterial contamination requires that appropriate hygienic procedures be used in connection not only with apparatus conventionally recognized as being potential sources of contamination, such as food utensils and lavatory equipment, but also in connection with clothing and cleaning equipment.

Improved sanitation over a wide spectrum of human activities reduces the incidence of bacterial and fungal infection but becomes a significant burden if it requires new procedures or processing steps in addition to those already in common usage. It is manifestly advantageous to incorporate wherever possible into substances and/or procedures now commonly used in everyday life appropriate compounds which kill or inhibit the growth of bacteria and fungi. Many water-soluble bacteriostats have been discovered, but to date relatively few oil-soluble bateriostats or fungicides are known, despite the current existence of several cleaning products or processes which involve oil-type solvents or diluents.

In addition to improving human sanitation, where killing or inhibiting of pathogenic bacteria is a primary objective, there are many instances where the presence or growth of micro-organisms such as bacteria or fungi interfere with industrial processes or the products thereof. Illustrations of such instances are the growth of micro-organisms in natural or synthetic rubber latices, which ordinarily spoils the latex and also contaminates for future use the processing equipment, such as tanks, pipe lines, etc.; in adhesives, which spoils the product; and in the special muds used in drilling oil wells, which severely diminishes the continued effectiveness of the mud. Furthermore, there is a continuing need in agriculture for fungicides.

Based on the discovery of the bacteriostatic and fungicidal properties of hexahydro-1,3,5-trialkyl-s-triazines where the alkyl groups of the triazine are selected from the class consisting of methyl, ethyl and mixtures thereof, an object of this invention is to provide solvents containing such triazines for use in dry cleaning processes whereby growth of bacteria on the cleaned fabric is inhibited.

Another object is to provide oil-based mop saturants containing minor amounts of such triazines for sanitizing mops.

A further object is to provide cosmetic lotions, containing minor amounts of such triazines, which are resistant to mold growth.

Another object is to provide dilute solutions of such triazines for use as agricultural fungicides, especially for the treatment of foliage.

An additional object is to provide a composition and process effective to inhibit microbial growth in drilling muds.

Yet another object is to provide compositions and a means effective to inhibit the growth of spoilage organisms in rubber latices and to prevent the contamination of process equipment with such organisms.

A further object is to provide compositions and a means effective to inhibit the formation of mold growth or spoilage in adhesives.

Other objects and applications of such discovery will become apparent during the following description.

It has now been discovered that minor amounts of hexahydro-1,3,5-trialkyl-s-triazines, where the alkyl groups are methyl and/or ethyl radicals, inhibit the growth of bacteria, fungi and other micro-organisms. Such triazines are effective to inhibit such growth when applied to surface areas, such as foliage, fibers, and the like, in diluted form in a carrier or solvent, preferably an oily solvent, inert with respect to such areas. They are further effective to inhibit the growth of unwanted micro-organisms when added, in relatively pure form or when dissolved in a solvent, to solids or fluids, such as cosmetic preparations, adhesives, synthetic or natural rubber latices, and drilling mud. Only a minor but bactericidally and/or fungicidally effective amount of such triazines needs to be used, in the range of from about 0.001 to about five weight percent (based on total composition) and depending in part on the environment where the triazine is used and sufficient to impart bacteriostatic or fungicidal characteristics.

Petroleum distillate fractions, e.g. naphtha, kerosene, gas oils, pharmaceutical grades of mineral oils, propane, butane, LPG, and low boiling aromatic fractions such as toluene and xylenes, are appropriate solvents for such triazines. Halogenated hydrocarbon solvents also are suitable, and water may be used when desired since such triazines are also water soluble.

Illustrative uses of such triazines as a bacteriostat and fungicide are in the dry cleaning of clothes. When used in dry cleaning, hexahydro-1,3,5-triethyl-s-triazine is dissolved in a chlorinated hydrocarbon dry cleaning solvent, such as carbon tetrachloride, trichlorethylene, perchlorethylene and the like, or in petroleum hydrocarbon solvents such as Stoddard solvent or other commercially available solvents comprising virgin, processed and/or especially blended fractions of petroleum. Such solvents, containing from about one tenth to about one or two weight percent of the triazine, are used to dry clean clothes. After removal of the solvent, a small amount of the triazine remains on the cloth, and inhibits the growth of bacteria and fungi.

Another illustrative use is in sanitizing floor mops by adding a small amount, such as in the range of one tenth to about one or two percent, of a hexahydro-1,3,5-trialkyl-s-triazine to a mop saturant before application of such saturant to a mop. Mop saturants which are suitable carriers for a hexahydro-1,3,5-trialkyl-s-triazine of this invention typically include kerosene or naphtha fractions from petroleum which are often deodorized by processing and sometimes include a surfactant.

Such triazines may be used as foliage fungicides by spraying on the foliage a dilute solution of the triazine dissolved in an oily solvent which is non-phytotoxic, preferably a naphtha or kerosene.

Additional illustrative uses of the triazines referred to herein are the prevention or inhibition of the growth of micro-organisms such as bacteria and/or fungi in normally liquid or solid compositions. They are useful in preventing mold growth in cosmetic lotions, such as hand lotions, liquid cold cream, and antiperspirants, and may be incorporated into the cosmetic during its manufacture in bactericidally and/or fungicidally effective amounts in the range of from about 0.01 to about five percent, based on the total cosmetic composition.

Such triazines are also useful in industrial products and processes, as distinct from uses primarily involving the human body and its environs, or agriculture. One such use is in the drilling muds commonly used in drilling oil wells. These muds typically contain organic materials and are exposed during use to contamination with micro-organisms found in the earth's surface soil. Unless inhibited, such micro-organisms multiply so rapidly that the usefulness of the drilling mud is decreased rapidly. The addition of relatively small amounts, from about 0.001 percent and extending up to about three to five percent, by weight of the drilling mud composition, is effective to inhibit the growth of such micro-organisms and prolong the useful life of the mud.

Rubber latices, comprising either synthetic and natural rubber, are notoriously subject to contamination and spoilage by micro-organisms. Such contamination often occurs during manufacture or intermediate storage, and results in the contamination of the process equipment (tanks, vessels, pipe lines, etc.) being used. Once such equipment becomes contaminated, it is difficult to decontaminate, and hence the probability of contaminating subsequent batches of latex is substantial. The triazines herein described are useful to inhibit for prolonged periods the growth in rubber latex of spoilage micro-organisms when used in amounts in the range of 0.001 percent to about one percent by weight. Naturally, more may be used if desired. Also, additional triazine may be added from time to time during storage of the latex.

Another use in adhesives based on starch and/or protein, which are often spoiled during storage or use by the growth of micro-organisms. Illustrative adhesives which may be protected by the use of such triazines include those based upon corn or wheat starch, casein, or soya flour. The amount of triazine to be used depends in part on the type of adhesive, the desired duration of protection, and the anticipated extent of contamination by micro-organisms. Suitable amounts vary upwards from as low as 0.001 weight percent, depending upon the aforesaid factors.

A further use is in cutting or lubricating oils.

The preparation of hexahydro-1,3,5-triethyl-s-triazine is disclosed by Graymore in the 1930 volume of the Journal of the Chemical Society at page 1490; and the preparation of hexahydro-1,3,5-trimethyl-s-triazine is referred to in U.S. Pat. No. 2,944,088. Additional references to the preparation of such triazines are available in Beilstein's "Handbuch der Organischen Chemie."

Although such triazines are used for the purposes herein described in relatively minor amounts, rarely at a concentration of more than 5 percent and often in the range of 0.01-1 percent, it is convenient to prepare and ship a concentrate in which the triazine predominates and is dissolved in a minor amount of a suitable solvent having a high solvency for the triazine, such as an organic solvent or water. The triazine may be added to a composition as the concentrate (as, for instance, to a latex adhesive) or the concentrate may be substantially diluted with additional solvent to yield at the locality of application a dilute solution comprising a minor amount, usually less than five percent, of the active ingredient.

The amount of triazine to be used in the various applications depends upon a number of factors, and does not permit stating a precise quantitative range to encompass all situations. Such factors include the character of expected micro-organisms to be inhibited, the anticipated extent or current existence of contamination by micro-organisms, the frequency of re-exposure, the expected use, if any, of additional triazine added after the initial amount, and the character of the product or environment in which the triazine is used. The minimum, useful maximum and optimum amounts of triazine to be used may be determined for any specific use by routine testing, using methods now known to those skilled in the various arts. As a general guide, however, the minimum useful amount will be on the order of 0.001 percent by weight, and often 0.01 percent. Amounts in excess of 5 percent are rarely necessary or useful.

It will be noted that the triazines are applied to areas, such as to foliage, or introduced into liquid or solid compositions, where micro-organisms do or may exist or grow. The word "locus" as used in the claims connotes the site of use of the triazines and is intended to encompass uses of the type described herein. The following specific examples further illustrate the invention.

EXAMPLE 1

The biological activity of hexahydro - 1,3,5-triethyl-s-triazine has been demonstrated against various bacteria and fungi. The hexahydro-1,3,5-triethyl-s-triazine used to demonstrate such activity was prepared by slowly adding 2600 grams of 70% mono-ethyl amine (40.5 moles) to 3000 grams of 40% formaldehyde (40 moles) in 2600 ml. of water at 35–45° C. over a period of 2.5 hours. The reaction mixture was stirred for 1 hour at 25–3° C., then 1000 grams of flake potassium hydroxide was added to separate the oily product from the water. The water layer was removed and the crude triazine was distilled under reduced pressure, yielding 1851 grams (81.1% of the theoretical) of hexahydro-1,3,5-triethyl-s-triazine, having a refractive index of $n_D^{25}$ 1.4588.

Screening tests to determine the minimum concentration of this material necessary to inhibit the growth of various micro-organisms were performed. The Agar Incorporation technique was used for the fungus, *Aspergillus niger*, and the Zone of Inhibition test for three bacteria, *Bacillus subtilis*, *Staphylococcus aureus*, and *Salmonella typhosa*. The bacteriostatic activity of "Ivory" brand white toilet soap (a neutral white high grade toilet soap understood to consist of a mixture of 80% sodium soap and 20% potassium soap produced from a blend of 70% tallow and 30% coconut oil glycerides) in which 1% of the bacteriostat had been incorporated was also determined by the Zone of Inhibition test. Results of these are summarized below:

TABLE I.—BIOLOGICAL ACTIVITY OF HEXAHYDRO-1,3,5-TRIETHYL-s-TRIAZINE

| Organism | Minimum conc'n. for inhibition of growth, p.p.m. | Zone of inhibition in millimeters, 1% in soap |
| --- | --- | --- |
| *Aspergillus niger* | 1,000 | (a) |
| *Bacillus subtilis* | 1,000 | 42 |
| *Staphylococcus aureus* | 1,000 | 40 |
| *Salmonella typhosa* | 1,000 | 40 | a The zone of inhibition test is not routinely performed on *Aspergillus niger*.

EXAMPLE 2

In a second series of tests, varying amounts of hexahydro-1,3,5-triethyl-s-triazine were dissolved in (A) a deodorized kerosene; (B) a commercially available deodorized kerosene dust mop saturant (a product of the Fuller Brush Company marketed under the trade name of "Dust Magnet Regular"); (C) a second deodorized kerosene mop saturant containing minor amounts of a surfactant (a Fuller Brush Company product marketed under the trade name of "Dust Magnet Aerosol"); and (D) a pharmaceutical grade white mineral oil having a specific gravity at 60° F. of 0.872 (marketed under the trade name Esso Marcol 130). Strands of an ordinary cotton mop were dipped into the mop saturant under test and air-dried on cardboard for ten minutes. They were then subjected to Zone of Inhibition tests using the bacteria Staphylococcus aureus and Escherichia coli and the fungus, Trichophyton interdigitale, as test organisms. The bacterial plates were incubated at 37°±0.5° C. for 24 hours, and the fungus plates were incubated at room temperature for 4 days. The diameter of the Zone of Inhibition reported below is the total width of the clear zone less the diameter of the mop strand in each case:

TABLE II.—BACTERIOSTATIC EFFECT OF HEXAHYDRO-1,3,5-TRIETHYL-s-TRIAZINE IN HYDROCARBON SOLUTIONS

| Oil base | Bacteriostat concentration, weight percent | Diameter of zone of inhibition, mm. | | |
|---|---|---|---|---|
| | | S. aureus | E. Coli | T. interdigitale |
| A. Kerosene | 0 | 0 | 0 | 0 |
| | 0.1 | 4 | 4 | |
| | 0.2 | 12 | 8 | |
| | 0.5 | 22 | 14 | |
| B. Dust magnet regular | 0 | 0 | 0 | 0 |
| | 0.1 | 1 | 0.5 | 0 |
| | 0.2 | 4 | 1 | 0 |
| | 0.5 | 13 | 10 | 0 |
| C. Dust magnet aerosol | 0 | 0 | 0 | 0 |
| | 0.1 | 1 | 0.5 | 0 |
| | 0.2 | 2 | 4 | 1 |
| | 0.5 | 14 | 10 | 20 |
| D. White mineral oil | 0 | 0 | 0 | 0 |
| | 0.1 | 0.5 | 0 | 0 |
| | 0.2 | 8 | 0.5 | 4 |
| | 0.5 | 24 | 10 | 20 |

This test shows the efficacy of hexahydro-1,3,5-triethyl-s-triazine as a bacteriostat in a mop saturant. The use of a hexahydro-1,3,5-trimethyl-s-triazine will produce similar results.

EXAMPLE 3

A sanitizing test demonstrated that hexahydro-1,3,5-triethyl-s-triazine is suitable for sanitizing a soiled mop, using the mop saturant denoted (C) above. The strands of a cotton dust mop were divided into a number of equal portions. The canvas backing of each portion was saturated with mop saturant (which did not contain any triazine) to render it non-absorptive, which is to say, to prevent the triazine-containing saturant applied later to the strands from being dispersed into the canvas backing by "wicking." Then the strands of each portion were treated according to the directions of the commercial products being tested, placed in a 16-oz. jar, and aged for 24 hours to allow complete saturation. The measured equivalent of two one-inch square swatches were cut for each test and also for the untreated controls, placed in 4-oz. jars, and autoclaved. The strands in each jar were inoculated with 0.5 ml. of inoculum prepared by seeding 1000 ml. of AATCC Bacteriostasis Broth (Difco Laboratories) with 10 ml. of an 18-hour broth culture of Staphylococcus aureus (antibiotic resistant strain). The tests were performed in triplicate. For the zero time reading, one of the controls was diluted at once with 100 ml. of sterile water, shaken 64 times, and serial dilutions from 1:1000 to 1:1,000,000 performed using Tryptone Glucose Extract agar (Difco) as the plating medium. The remaining jars were incubated at 37°±0.5° C. for 48 hours. Percent reduction of bacterial colony count of test samples as compared with the zero time control were calculated and are reported below.

TABLE III

Sanitizing effect of hexahydro-1,3,5-triethyl-s-triazine

Formulation: Dust Magnet Aerosol:
    Bacteriostat concentration, percent _____ 0.3, 0.5
    Bacteria count reduction, percent _____ 94, 97

These data strikingly illustrate the effectiveness of mop saturant formulations containing 0.3 to 0.5% hexahydro-1,3,5-triethyl-s-triazine for sanitizing dust mops.

EXAMPLE 4

Hexahydro-1,3,5-triethyl-s-triazine was tested as a bacteriostat in two solvents typically used in dry cleaning, the first being perchlorethylene, representing the chlorinated-hydrocarbon type, and the second Sovasol No. 2, a refined, straight run petroleum naphtha boiling in the range of 125 to 225° F. The dry cleaning solutions were formulated as follows:

| Component: | Percent by weight |
|---|---|
| Hexahydro-1,3,5-triethyl-s-triazine | 0.1 or 0.5 |
| Oil-soluble detergent | 0.2 |
| Water | 0.5 |
| Dry cleaning solvent | q.s. to 100 |

(The detergent used above was Union Carbide Corporation's Tergitol NP-14 brand of monyl phenyl polyethylene glycol.)

Discs of white woolen cloth having a diameter of 19 mm. were used for the test. They were agitated in bacteriostat-containing and also in untreated (control) dry cleaning solutions, then air-dried. After drying, the discs were placed on agar plates seeded with Staphylococcus aureus and incubated at 37° C. for 48 hours, then the diameter of the zones of inhibition were measured in millimeters.

TABLE IV.—HEXAHYDRO-1,3,5-TRIETHYL-s-TRIAZINE IN DRY CLEANING SOLUTIONS

| Solvent | Bacteriostat concentration, percent | Diameter of zone of inhibition, mm. |
|---|---|---|
| Perchlorethylene | 0 | 0 |
| | 0.1 | 16 |
| | 0.5 | 14 |
| Solvasol No. 2 | 0 | 0 |
| | 0.1 | 16 |
| | 0.5 | 24 |

These data show that sufficient triazine is retained on dry cleaned fabric to exert a decided bacteriostatic effect even at the low concentration of 0.1 weight percent. No noticeable odor from the bacteriostat is retained on the fabric.

It thus has been demonstrated that the inclusion of a minor amount of hexahydro-1,3,5-triethyl-s-triazine in representative dry cleaning solvents and mop saturants imparts bacteriostatic characteristics to the treated fabric. The inclusion of a hexahydro-1,3,5-trialkyl-s-triazine in such formulations permits their use in currently conventional processes of dry cleaning and mopping floors without introducing additional process steps, and at a nominal cost.

EXAMPLE 5

In addition to their use in mop saturants and dry cleaning solvents, the hexahydro-1,3,5-trialkyl-s-triazines described herein effectively prevent mold growth in cosmetic compositions, such as hand lotion, liquid cold cream, and anti-perspirants. Illustrative formulations of cosmetics in which the triazines may be used as preservatives are tabulated:

HAND LOTION

| Composition, weight percent | |
|---|---|
| Cetyl alcohol | 0–3 |
| Stearic acid | 3–6 |
| Butyl stearate | 0–0.5 |
| Complex magnesium aluminum silicate | 0.5–1.0 |
| Glycerine | 1.0–4.0 |
| Triethanolamine | 0.1–0.5 |
| Hexahydro-1,3,5-trialkyl-s-triazine | 0.01–0.5 |
| Water | Q.s. to 100 |

LIQUID COLD CREAM

| | |
|---|---|
| Complex magnesium aluminum silicate | 0.5–2.0 |
| Beeswax | 1.0–3.0 |
| Spermaceti | 1.0–3.0 |
| Mineral oil | 10.0–30.0 |
| Sorbitan monopalmitate | 1.0–6.0 |
| Polyoxyethylene (20) sorbitan monostearate | 1.0–6.0 |
| Hexahydro-1,3,5-trialkyl-s-triazine | 0.01–5.0 |
| Water | Q.s. to 100 |

ROLL-ON ANTIPERSPIRANT LOTION

| | |
|---|---|
| Complex magnesium aluminum silicate | 0.75–2.0 |
| Lanolin sterol extracts | 3.0–6.0 |
| Polyoxyethylene derivative of lanolin | 0.0–4.0 |
| Cetyl alcohol | 0.5–2.0 |
| Glycerine | 1.0–5.0 |
| Glyceryl monostearate SE (Acid Stable) | 3.0–6.0 |
| 50% Aluminum chlorhydroxide complex | 20.0–40.0 |
| Hexahydro-1,3,5-trialkyl-s-triazine | 0.01–5.0 |
| Water | Q.s. to 100 |

BRUSHLESS SHAVING CREAM

| | |
|---|---|
| Stearic acid | 10.0–20.0 |
| Cetyl alcohol | 0.2–2.0 |
| Lanolin | 0.2–2.0 |
| Complex magnesium aluminum silicate | 1.0–2.0 |
| Glycerine | 5.0–12.0 |
| Potassium hydroxide | 0.2–0.4 |
| Hexahydro-1,3,5-trialkyl-s-triazine | 0.01–5.0 |
| Water | Q.s. to 100 |

OINTMENT BASE EMULSION

| | |
|---|---|
| Polyethylene glycol 400 monostearate | 10.0–20.0 |
| Complex magnesium aluminum silicate | 3.0–6.0 |
| Polyoxyethylene sorbitan monooleate | 0–2.0 |
| Hexahydro-1,3,5-trialkyl-s-triazine | 0.01–5.0 |

Preferred amounts of the triazines used in such formulation are in the range from about 0.05 to about 1 percent.

EXAMPLE 6

A cosmetic preservative test demonstrated that hexahydro-1,3,5-triethyl-s-triazine is effective for the control of mold growth during shelf storage of such formulations. A silicone barrier lotion was formulated as follows:

| Ingredient: | Parts by weight |
|---|---|
| Complex colloidal magnesium aluminum silicate (Veegum K brand) | 1.75 |
| Water | 80.15 |
| Hexahydro-1,3,5-triethyl-s-triazine | as indicated |
| Silicone fluid (Dow Corning 555) | 5.00 |
| Stearic acid | 5.00 |
| Polyoxyethylene sorbitan monolaurate (Tween 20 brand) | 4.50 |
| Sorbitan monolaurate (Aracel 20 brand) | 3.50 |

A first mixture was made by rehydrating the colloidal magnesium aluminum silicate, then adding 0.10 parts by weight of hexahydro-1,3,5-triethyl-s-triazine to the treated test formulations, but omitting it from control formulations and heating the thusformed mixture to 70° C. A second mixture was prepared by blending the remaining ingredients and heating to 75° C. The first and second mixtures were thoroughly homogenized, then stirred until the mix reached room temperature. 120-gram samples of treated and control formulations were placed in separate 4-ounce jars. Samples of each formulation were inoculated by streaking the surface with *Aspergillus niger* (from a 6–10-day slant maintained at room temperature on Sabouraud's agar) and incubated at room temperature. Additional samples were inoculated by streaking with *Pseudomonas aeruginosa* (cultured on A.A.T.T.C. bacteriostasis broth) and incubated at 37° C. All tests were examined daily for evidence of fungus growth and the first appearance of growth was noted. Thereafter, treated samples were examined periodically for five months. The results are tabulated below.

TABLE V

| | Growth on silicone barrier lotion | |
|---|---|---|
| Test organisms | Control | Treated |
| *Aspergillus niger:* | | |
| After 5 days | Copious | None. |
| After 5 months | | Do. |
| *Pseudomonas aeruginosa:* | | |
| After 22 days | Copious | Do. |
| After 5 months | | Do. |

EXAMPLE 7

This example illustrates the use of the triazines to inhibit the growth of micro-organisms in drilling muds. A drilling mud containing any organic material such as organic thickeners or surfactants, has to be protected from microbial growth in order to retain its necessary physical properties.

A drilling mud masterbatch was prepared from a 4% slurry of bentonite clay in water by storing it for 24 hours, adjusting the pH to 8.5 to 9.5, then stirring into it potato starch at the rate of 3.5 lbs. per barrel (of 42 gallons) of slurry. A high speed stirrer was used, and stirring was continued for 15 minutes after the addition of the potato starch was complete. The masterbatch was then inoculated by adding 1 ml. of spoiled drilling mud per 100 ml. of masterbatch.

The spoiled drilling mud used as the inoculum was prepared by inoculating a portion of prepared drilling mud with garden soil and incubating the mixture for three days at 37° C., to correspond to the way drilling mud becomes contaminated in actual use.

To separate portions of the inoculated drilling mud there was added 100 and 200 parts per million (p.p.m.) of hexahydro - 1,3,5 - triethyl - s - triazine. The treated drilling muds and a portion of untreated inoculated mud were incubated at 37° C. and plate counts were performed on Plate Count Agar after 7, 14, 21 and 28 days' incubation. Percent reduction in plate count was determined for each concentration of the triazine according to the equation.

$$\frac{(\text{Control count}) - (\text{Treated count})}{(\text{Control count})} \times 100 = \text{Percent reduction}$$

The average percent reduction in duplicate experiments is reported below.

TABLE VI

| | Average reduction of total bacterial count (percent) | | | |
|---|---|---|---|---|
| | 7 days | 14 days | 21 days | 28 days |
| Hexahydro-1,3,5-triethyl-s-triazine concn, p.p.m. | | | | |
| 200 | 44.44 | 99.99 | 99.99 | 90.76 |
| 100 | 33.33 | 99.99 | 99.95 | 43.84 |
| Untreated count, in thousands | 2,900 | 2,100 | 2,200 | 204,000 |

The plate count of the untreated mud is given to illustrate the magnitude of the bacterial contamination.

These data show that hexahydro-1,3,5-triethyl-s-triazine is effective in preserving the drilling mud over a long period of time, far longer than drilling muds are usually kept in service. More triazine may be used, up to about 3 to 5%, if desired.

EXAMPLE 8

Both natural and synthetic rubber latices are readily contaminated with spoilage organisms which render them useless for many purposes. Holding tanks, pipe lines and processing equipment, once contaminated, are difficult to decontaminate in order to prevent spoiling of subsequent batches of latex. The number of biocides suitable for the protection of latex from microbial spoilage is limited so the discovery of a new biocide which is economical, effective, and without deleterious effect on the latex and its subsequent processing is most useful and unexpected.

To separate portions of a highly contaminated styrene-butadiene latex obtained in the field there was added hexahydro-1,3,5-triethyl-s-triazine in a range of concentrations as shown in Table VII. Separate samples of each of the test compositions thus obtained where incubated at 27° C. and at 37° C. and total plate counts made after one, two, and three months using Plate Count Agar and an incubation temperature thereon of 37° C. The Total Plate Count Method used is described in the American Public Health Association's "Standard Methods for the Examination of Water and Waste Water," pages 492–3, eleventh edition, 1960. The total number of bacteria found in each sample after varying incubation periods is reported in Table VII.

TABLE VII

| Hexahydro-1,3,5-triethyl-s-triazine Concn., p.p.m. | Number of micro-organisms per milliliters* after— | | | | | |
|---|---|---|---|---|---|---|
| | One month at— | | Two months at— | | Three months at— | |
| | 27° C. | 37° C. | 27° C. | 37° C. | 27° C. | 37° C. |
| 100 | 900 | 200 | <100 | 30,000 | 4,700 | <100 |
| 200 | 100 | 1,000 | <100 | 1,000 | 4,000 | <100 |
| 400 | 100 | 7,600 | <100 | 500 | <100 | <100 |
| 500 | <100 | 6,000 | <100 | <100 | <100 | <100 |
| 750 | 500 | <100 | <100 | <100 | <100 | <100 |
| 1,000 | <100 | <100 | <100 | <100 | <100 | <100 |

*The symbol < means "less than."

These data demonstrate that even small concentrations of hexahydro - 1,3,5 - triethyl - s - triazine are effective to inhibit the growth for an extended time of micro-organisms in rubber latex. As the data indicate, lesser amounts, as low as about 50 p.p.m. (0.005 weight percent), may be used with effectiveness. When removing micro-organisms from previously contaminated tanks and other processing equipment, greater concentrations are used, up to about 3% and advantageously about 0.5 to 1.5%.

The triazine also may be used to reduce the incidence of micro-organisms in process equipment used to make latices which has become contaminated. This may be done by flushing the process equipment with a liquid which has dissolved in it an effective amount, on the order of at least one tenth percent, of the triazines.

EXAMPLE 9

This example illustrates the use of the triazines of this invention in inhibiting for prolonged periods the spoilage of adhesives on account of mold growth.

Separate masterbatches of starch, casein and soya adhesives containing 5% solids were prepared by stirring about 5 grams of the powdered solid into 95 grams of warm water (at about 100° F.), heating the entire mass to 160° F. while constantly stirring, then cooling to room temperature while exposed to the open air and thus to natural inoculation, before adding the test bactericide-fungicide and performing the tests. The specific formulations used were:

Starch-based adhesive: Five grams of corn or wheat starch was added to 95 grams of water at about 100° F. with stirring, the entire mass was heated to 160° F. with continued stirring, and then cooled to room temperature.

Casein-based adhesive: Five grams of casein and 0.5 grams of soda ash (10% by weight based on the casein) was stirred into 94.5 grams of warm water, the mass was heated to 160° F. with stirring, and then cooled to room temperature.

Soya-based adhesive: Five grams of soya flour was stirred into 95 grams of warm water, the temperature then raised to 160° F. while stirring, and mass was then cooled to room temperature.

Aliquots of each adhesive were placed in separate containers and the test compound added to the test composition thus prepared at concentrations of 0.001, 0.005, 0.01, 0.05, and 0.1% based on the weight of the composition. An untreated portion of each adhesive served as a control. The containers were placed in a 37° C. incubator and examined daily for evidence of mold growth or of spoilage (as indicated by odor or by gas formation). The number of days before mold growth or spoilage could be detected as a result of the natural contamination of these adhesives is reported in Table VIII.

TABLE VIII

| Hexahydro-1,3,5-triethyl-s-triazine concn., percent | Number of days before spoilage was detected* | | |
|---|---|---|---|
| | Starch | Casein | Soya flour |
| None | 6 | 6 | 1 |
| 0.001 | >365 | 6 | 6 |
| 0.005 | >365 | 6 | 6 |
| 0.01 | >365 | 6 | 32 |
| 0.05 | >365 | 32 | >365 |
| 0.1 | >365 | 108 | >365 |

*The symbol > means "more than."

The case in test shows that 0.1% hexahydro-1,3,5-triethyl-s-triazine is adequate to protect this sensitive adhesive longer than the shelf life or pot life of such compositions. Soya flour, which contains both starch and protein, is protected for more than a year by the new biocide at 0.05%. Starch adhesives are not usually much of a problem and 0.001% of the triazine protected it for more than a year. These data are based on the natural inoculation during cooling and before addition of the triazine. Naturally, a greater concentration of triazine probably would be necessary to achieve comparable preservation if the adhesive compositions were to be exposed to continued contamination during storage or use.

It is to be understood that modifications may be made to the described embodiments without departing from the scope and spirit of the invention. Having thus described the invention, what is claim is:

1. A method of controlling microorganisms selected from the group consisting of fungi and bacteria which comprises applying to said microorganisms, a fungicidally or bactericidally effective amount of a hexahydro-1,3,5-trialkyl-s-triazine wherein the alkyl groups are methyl, ethyl or mixtures thereof.

2. The method of claim 1 wherein said triazine is applied in the form of a solution of from one hundredth to five weight percent of said triazine in a solvent therefor, said solvent being water or a petroleum fraction selected from the group consisting of liquified but normally gaseous hydrocarbons, naphtha, kerosene, gas oils, pharmaceutical grade mineral oil, toluene, xylene, lubricating oils, cutting oils and mixtures of said petroleum fractions.

3. A method of controlling microorganisms on foilage, microorganisms being selected from the group consisting of fungi and bacteria which comprises applying to said foliage, a fungicidally or bactericidally effective amount of a solution of from one tenth to five weight percent of hexahydro 1,3,5-trialkyl-s-triazine wherein the alkyl groups are methyl, ethyl or mixtures thereof in a solvent therefor, said solvent being water or a petroleum fraction selected from the group consisting of liquified but normally gaseous hydrocarbons, naphtha, kerosene, gas oils, pharmaceutical grade mineral oil, toluene, xylene, lubricating oils, cutting oils and mixtures of said petroleum fractions.

References Cited

UNITED STATES PATENTS

| 2,675,382 | 4/1954 | Melamed | 424—249 X |
| 2,944,088 | 7/1960 | Kauder | 424—249 |

ALBERT T. MEYERS, Primary Examiner

L. SCHENKMAN, Assistant Examiner

U.S. Cl. X.R.

424—65

UNITED STATES PATENT OFFICE
CERTIFICATE OF CORRECTION

Patent No. 3,755,590    Dated August 28, 1973

Inventor(s) Lester A. Brooks, Allan M. Harvey

It is certified that error appears in the above-identified patent and that said Letters Patent are hereby corrected as shown below:

Column 1, line 34   "s tandards" should read --standards--.

Column 2, line 40   "needs" should read --need--.

Column 3, line 16   after "five" insert --weight--.

Column 4, line 37   "25-3°C" should read --25-30°C--.

Column 9, line 11   after "are" insert --very--.

Column 10, line 45  "case in" should read --casein--;

line 61  "claim" should read --claimed--.

Signed and sealed this 25th day of December 1973.

(SEAL)
Attest:

EDWARD M. FLETCHER, JR.
Attesting Officer

RENE D. TEGTMEYER
Acting Commissioner of Patents